United States Patent [19]

Mitchell et al.

[11] 4,174,933

[45] Nov. 20, 1979

[54] FORMING AN EXTRUDED BAR OUT OF METAL CHIPS

[75] Inventors: Robert D. Mitchell, Harwood Heights, Ill.; Albert C. Schulz, Hudson, Ohio

[73] Assignee: Combustion Engineering, Inc., Windsor, Conn.

[21] Appl. No.: 864,413

[22] Filed: Dec. 27, 1977

[51] Int. Cl.[2] .................... B29F 3/06

[52] U.S. Cl. .................... 425/79; 425/97; 425/191; 425/376 R; 425/461

[58] Field of Search .................... 264/176 R; 425/79, 97, 425/376 R, 378 R, 379 R, 380, 191, 192 R, 461

[56] References Cited

U.S. PATENT DOCUMENTS

| | | | |
|---|---|---|---|
| 2,783,499 | 3/1957 | Billen | 425/79 X |
| 3,265,778 | 8/1966 | Griffith | 425/97 X |
| 3,294,757 | 12/1966 | Church | 425/378 X |
| 4,025,337 | 5/1977 | Woodburn et al. | 425/79 X |

*Primary Examiner*—Mark Rosenbaum
*Attorney, Agent, or Firm*—Robert L. Olson

[57] ABSTRACT

Apparatus for extruding metal chips or filings into a bar stock. The extruding machine uses graphite lubrication, and an oversized wooden (or other compressible material) plug for the initial compaction. The face of the ram contains undulations therein so the ends of adjacent charges will be better held together.

2 Claims, 2 Drawing Figures

FORMING AN EXTRUDED BAR OUT OF METAL CHIPS

BACKGROUND OF THE INVENTION

In various machining operations, an abundance of metal chips and filings are generated which used to be discarded as waste. Presently, these metal particles are formed into briquettes, and shipped back to the foundry or steel mill where they are remelted, so that they can ultimately become a usable product. In these days of energy shortages, the energy necessary to melt these briquetted chips and/or filings prior to reshaping or reforming them, is costly and also fuel and energy consuming. It would be desirable if the metal chips and filings could be worked into a final form without the necessity of remelting.

SUMMARY OF THE INVENTION

In accordance with the invention apparatus is provided for extruding metal chips or filings into a bar stock. The extruding machine uses graphite lubrication, and an oversized wooden plug to accomplish the initial compaction of the metal particles. The face of the ram contains undulations therein so the ends of adjacent charges of metal particles will be better held together. Thus, these metal particles can be reformed into a final product without the necessity of remelting, which would require consumption of costly and scarce fuels.

DESCRIPTION OF THE PREFERRED EMBODIMENT

Figure 1:
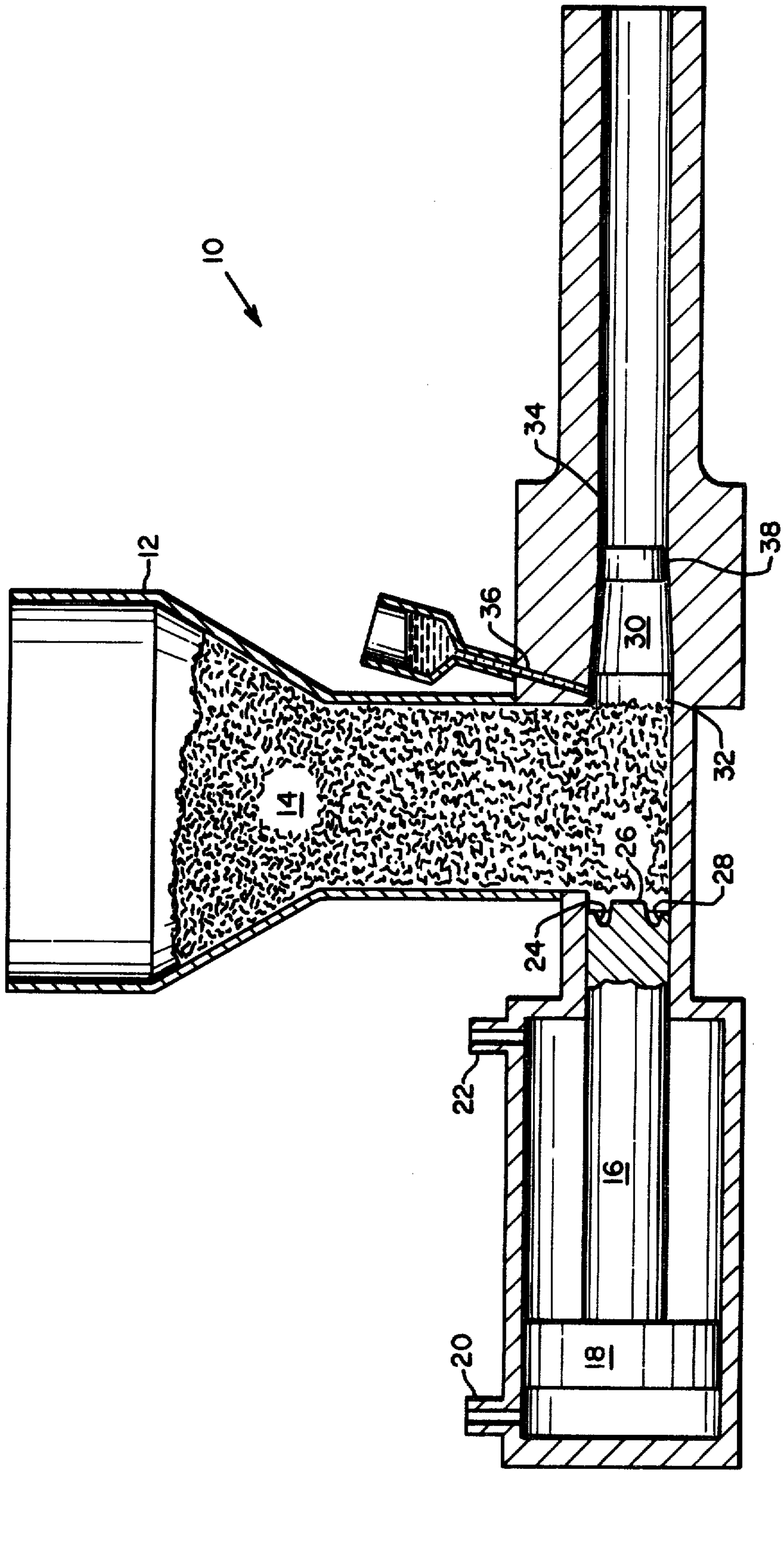
FIG. 1 is a sectional side view of the extruding machine of the invention.

Looking now to the drawings, numeral 10 indicates the extruding machine in its entirety. A hopper or bin 12 contains the metal particles 14 (chips or filings) which are to be extruded into a bar stock. A ram 16 is reciprocable in the lower portion of the bin by means of hydraulic forces through inlets 20 or 22, which can be applied to either side of the piston 18, which is attached to the ram 16. The end face 24 of the ram 16, which comes into contact with the metal particles, has a centrally located protuberance 26 surrounded by an annular indention 28, which flares back out near its outer periphery. The reason for these undulations or particular shape or configuration will be explained in more detail later. The extruding die 30 has an inlet end 32 having a large diameter, and an outlet end 34 having a somewhat smaller diameter. The ratio of these diameters may be for example, 2:1. In order to reduce the wear on the die 30 caused by friction, graphic 36 or other lubricants compactible within material being extruded, is introduced around the periphery of the die at its inlet end 32 by a means of a series of openings directed thereto. These lubricants also prevent the material being extruded from welding to the die surfaces 30 because of the high friction occurring during extrusion.

A wooden (or other compressible material) plug 38 is initially placed in the extruding machine, for causing the initial compaction of the metal particles 14. This plug 38 is small enough so that it will enter the inlet end 32 of the extruding die, but is larger than the outlet end 34, so that it will have to be compressed before it can pass through the extruding die. Once the machine has been put into operation, and the particles have been compacted sufficiently to force the wooden plug 38 through the reducing die 30, the resistance of the metal particles themselves to compaction as they pass through the reducing diameter portion of the extruding die, creates the back pressure necessary for causing compaction of the metal particles into a single bar stock.

Figure 2:
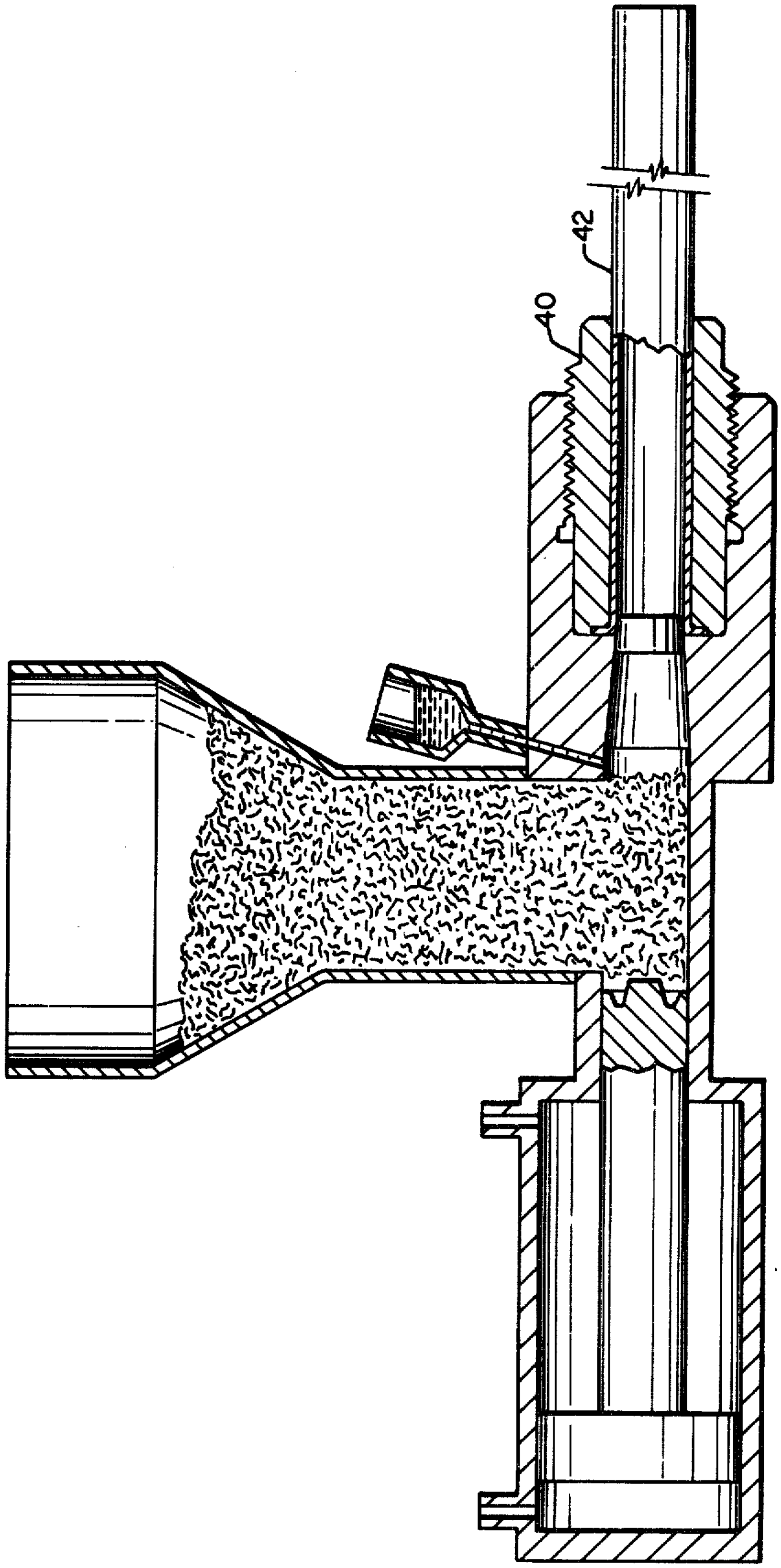
FIG. 2 is a sectional side view showing a modified machine.

The FIG. 2 embodiment is the same as FIG. 1 with one exception. In FIG. 2, the guide tube 40 is made removable. It can be used for securing a thin walled tube 42 in the outlet of the extruding machine. Thus, a rod of dense extruded material, captured in the tube 42, can be formed. When the tube is completely full, the guide tube 42 can be removed, allowing removal of the tube 42 filled with compacted material. This filled tube can be heated for subsequent forging or extrusion processing without oxidation. The tube would reduce during such process so that a case of thin metal would enclose the core composed of consolidated granular material. A material with such a case would have similar external properties to solid bar stock, such as smooth surface, regular appearance and oxidation resistance.

The operation of the machine should be obvious. When initially starting, a wooden plug 38 is placed at the inlet end 32 of the extruding die. This provides the initial compaction, and also provides for a flat end on the bar stock. Metal chips 14 entirely fill the bin, while the ram 16 is in its withdrawn position, being located entirely out of the bin. To start the operation, the ram is moved through the bin, forcing a charge of metal chips or filings into the inlet end 32 of the extruding die. Depending on the compactability of the metal chips or filings, and the resistance set up by the wooden plug 38 initially, one or more reciprocations of the ram will be necessary to initially move the wooden plug 38 entirely through the extruding die 30. As the ram 16 is reciprocated back out of the bin again, to allow another charge of metal particles to fill the lower portion thereof, and then move back into and through the bin again, the matching end faces of the charges wil be interlaced or interlocked because of the undulations 24 on the surface of the ram end. As these interlaced portions pass through the reducing diameter portion of the extruding die, they are squeezed tightly together, forming one continuous string or chain of extruded metal bar stock. The graphite 36 introduced around the periphery of the inlet end 32 of the extruding die prevents excessive wear, which would occur without it. This would cause a lot of downtime, necessary to replace the extruding die 30, making the operation more costly.

From the above, it can be seen that the apparatus of the invention allows metal chips or filings to be extruded into a continuous bar stock in an efficient and reasonably priced manner, without the necessity of remelting, which would require large amounts of energy. The finished bar stock from use of the present invention would not have the strength of bar stock made by melting the metal particles and thereafter casting, but there should be sufficient strength in the extruded bar stock for any number of uses; i.e., aluminum windows could be made in this manner.

What is claimed is:

1. Extruding apparatus for extruding metal particles into bar stock; including:

a bin for holding the metal particles;

an extruding die having an inlet end opening into a lower portion of the bin, an outlet end through which the finished bar stock is discharged, and a passageway of reducing diameter connecting the inlet end with the outlet end, the inlet end being of a larger diameter than the outlet end;

a ram;

means operatively associated with the ram for reciprocating the ram back and forth through the lower portion of the bin, in alignment with the extruding die, an end surface of the ram which contacts the metal particles containing undulations therein;

means for distributing a lubricant into the extruding die around the periphery of the inlet end; and a compressible material plug positioned at the inlet end of the extruding die at the start of the extruding operation, said plug having a diameter smaller than the inlet end of the extruding die, but larger than the outlet end.

2. An extruding apparatus as claimed in claim 1 further comprising a removable guide tube for securing a thin walled tube which is to be filled with the compacted metal particles, said guide tube being coupled to the extruding die at the outlet end of the extruding die.

* * * * *